(12) United States Patent
Schmidt et al.

(10) Patent No.: US 9,846,053 B2
(45) Date of Patent: Dec. 19, 2017

(54) METHOD AND APPARATUS FOR CREATING MAP DATA

(71) Applicants: TomTom Development Germany GmbH, Amsterdam (NL); TomTom International B.V., Amsterdam (NL)

(72) Inventors: Gunnar Schmidt, Berlin (DE); Antoine Carl van der Laan, Lelystad (NL)

(73) Assignee: TOMTOM TRAFFIC B.V., Amsterdam (NL)

( * ) Notice: Subject to any disclaimer, the term of this patent is extended or adjusted under 35 U.S.C. 154(b) by 0 days.

(21) Appl. No.: 14/761,650

(22) PCT Filed: Jan. 17, 2014

(86) PCT No.: PCT/EP2014/050936
§ 371 (c)(1),
(2) Date: Jul. 17, 2015

(87) PCT Pub. No.: WO2014/111537
PCT Pub. Date: Jul. 24, 2014

(65) Prior Publication Data
US 2015/0338235 A1 Nov. 26, 2015

(30) Foreign Application Priority Data
Jan. 18, 2013 (GB) .................... 1300901.4

(51) Int. Cl.
*G08G 1/123* (2006.01)
*G01C 21/36* (2006.01)
(Continued)

(52) U.S. Cl.
CPC ......... *G01C 21/3694* (2013.01); *G01C 21/32* (2013.01); *G01C 21/3461* (2013.01); *G01C 21/36* (2013.01); *G01C 21/3697* (2013.01)

(58) Field of Classification Search
CPC ........ G01C 21/3694; G01C 21/36; G06F 7/00
(Continued)

(56) References Cited

U.S. PATENT DOCUMENTS 8,694,241 B1 * 4/2014 Kadous ................ G08G 1/0112
701/118
2002/0194016 A1 * 12/2002 Moribe .............. G01C 21/3697
701/469
(Continued)

FOREIGN PATENT DOCUMENTS

CN 101405573 A 4/2009
CN 101853588 A 10/2010
(Continued)

OTHER PUBLICATIONS

Quantum GIS (QGIS) Tutorials: Tutorial: Making Heatmaps using QGIS and GRASS—webpage extract: qgis.spatialthoughts.com/2012/07/tutorial-making-heatmaps-using-qgis-and.html—obtained Nov. 20, 2012.
(Continued)

*Primary Examiner* — Mahmoud Ismail

(57) ABSTRACT

A method of creating map data for enhancing a digital map having a plurality of navigable segments representing a network of navigable segments by applying point locations to the map which correspond to individual events on the network; generating a heat map representing the concentrations of events according to a selected distribution function; applying a threshold calculation to the heat map to identify one or more zones, on the network having a high concentration of events; and associating the or each zone with at least one segment in the digital map.

20 Claims, 5 Drawing Sheets

(51) Int. Cl.
*G01C 21/32* (2006.01)
*G01C 21/34* (2006.01)
G01M 17/00 (2006.01)
G06F 7/00 (2006.01)
G06F 19/00 (2011.01)

(58) Field of Classification Search
USPC .......... 701/532, 423, 31.4, 469, 412; 705/1
See application file for complete search history.

(56) References Cited

U.S. PATENT DOCUMENTS

| | | | |
|---|---|---|---|
| 2010/0250045 A1* | 9/2010 | Miura | B60W 40/09 |
| | | | 701/31.4 |
| 2012/0179363 A1* | 7/2012 | Pierfelice | G01C 21/3461 |
| | | | 701/423 |
| 2014/0179347 A1* | 6/2014 | Murray | G01S 5/0027 |
| | | | 455/456.1 |

FOREIGN PATENT DOCUMENTS

| | | |
|---|---|---|
| CN | 102411843 A | 4/2012 |
| CN | 102564429 A | 7/2012 |
| CN | 102881182 A | 1/2013 |
| JP | 2009069062 A | 4/2009 |
| JP | 2012063360 A | 3/2012 |
| WO | 0155744 A2 | 8/2001 |
| WO | 0250794 A1 | 6/2002 |
| WO | 2012114909 A1 | 8/2012 |

OTHER PUBLICATIONS

"Evaluation of accident black spots on roads using Geographical Information Systems (GIS)"; D. Mandloi, R. Gupta; Map India Conference 2003.

"Applying Public Participation Approach to Black Spot Identification Process—A Case Study in Thailand", W. Kowtanapanich, Y. Tanaboriboon, W. Chadbunchachai; IATSS Research vol. 30 No. 1, 2006.

"Accident Mapping and Analysis Using Geographical Information Systems"; N. Deshpande, I. Chanda, S. Arkatkar; International Journal of Earth Sciences and Engineering, vol. 04, No. 06 SPL, Oct. 2011, pp. 342-345.

International Search Report dated Jun. 12, 2014 for International Application No. PCT/EP2014/050936.

Search Report dated Apr. 24, 2013 for United Kingdom Patent Application No. 1300901.4.

* cited by examiner

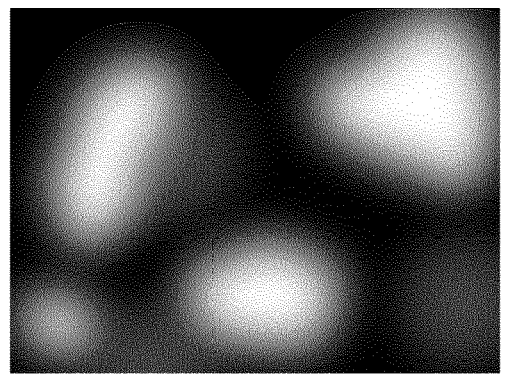
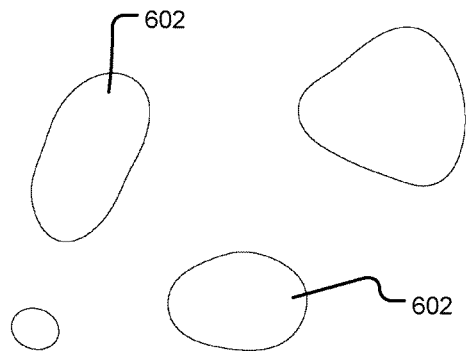
Figure 6a        Figure 6b
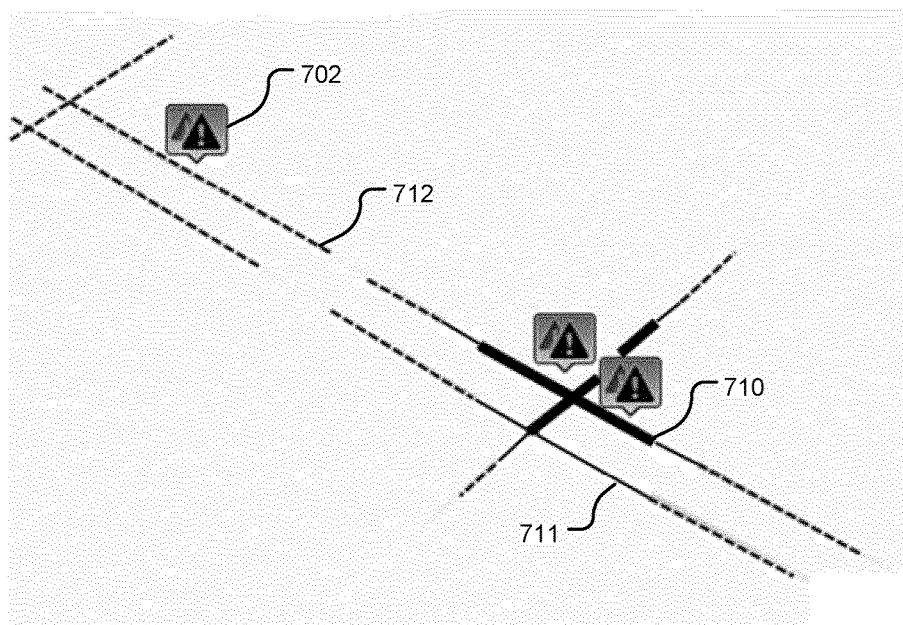
Figure 7

(12) United States Patent
US 9,846,053 B2

METHOD AND APPARATUS FOR CREATING MAP DATA

CROSS-REFERENCES TO RELATED APPLICATIONS

This application is the National Stage of International Application No. PCT/EP2014/050936, filed Jan. 17, 2014, and designating the United States, which claims benefit to United Kingdom Patent Application No. 1300901.4 filed Jan. 18, 2013. The entire content of these applications is incorporated herein by reference.

FIELD OF THE INVENTION

The present invention relates to a method and apparatus for creating map data for enhancing a digital map, and is concerned particularly, although not exclusively, with an apparatus and method for creating map data for the enhancement of a digital map to identify zones on segments of a navigable network in which events, such as traffic accidents, are of a high concentration.

BACKGROUND TO THE INVENTION

A variety of mobile devices now exist which have the capability of determining their own location. Portable navigation devices (PNDs) that include GNSS (Global Navigation Satellite Systems) signal reception and processing functionality are well known and are widely employed as in-car or other vehicle navigation systems. Such devices include a GNSS antenna, such as a GPS antenna, by means of which satellite-broadcast signals, including location data, can be received and subsequently processed to determine a current location of the device. The device may also include electronic gyroscopes and accelerometers that produce signals that can be processed to determine the current angular and linear acceleration. The determined acceleration may then be used in conjunction with location information derived from the GPS signal to determine the velocity and relative displacement of the device and thus that of a vehicle in which it is mounted. Such sensors are most commonly provided in in-vehicle navigation systems, but may also be provided in the PND itself.

In recent years, GPS has also been used in systems to warn drivers of the incidence of speed traps, enforcement cameras and road hazards, such as school zones and locations in which there has been a relatively high frequency of accidents, known as "accident black spots". In such systems, a device having a GPS antenna and access to a database containing the location of speed traps, accident black spots and other relevant items is typically provided in a vehicle. The device is configured to provide warnings to a driver when the vehicle, using the location information derived from the GPS signal, is in the vicinity of one of the locations stored in the database. One such system is described, for example, in WO 01/55744 A2.

Map data for electronic navigation devices, such as portable navigation devices as described above, comes from specialist map vendors. The data in these maps is specially designed to be used by route guidance algorithms, typically using location data from the GPS system. For example, navigable segments, such as roads, can be described as lines, i.e. vectors (e.g. start point, direction of road, with an entire road being made up of many hundreds of such segments, each uniquely defined by start point/end point direction parameters). A map is then a set of such vectors, data associated with each vector (speed limit; travel direction, etc.), and can further include points of interest (POIs), road names, other geographic features like park boundaries, river boundaries and the like, etc. All map features (e.g. vectors, POIs, etc.) are typically defined in a coordinate system that corresponds with or relates to the GPS coordinate system, enabling a device's position as determined through a GPS system to be located onto the relevant segment shown in a map for an optimal route to be planned to a destination.

Embodiments of the present invention aim to provide a method and apparatus for the improved notification of so-called accident black spots to a road user.

SUMMARY OF THE INVENTION

According to a first aspect of the present invention there is provided a method of creating map data for enhancing a digital map comprising a plurality of segments representing a network of navigable segments, the method comprising:
applying point locations to the map which correspond to individual events on the network;
generating a heat map representing the concentrations of events according to a selected distribution function;
applying a threshold calculation to the heat map to identify one or more zones on the network having a high concentration of events; and
associating the or each zone with at least one segment in the digital map.

The step of associating the or each zone with at least one segment may comprise associating zone location information with the segment, so as to indicate the location of the zone within the segment.

Preferably the method includes generating the heat map using a selected one of a plurality of distribution functions.

The point locations may correspond to events such as traffic incidents, which may comprise traffic accidents of one or more types selected from a plurality of types of accidents.

The point locations may have one or more attributes including, but not limited to: the time of an accident, direction of travel and/or speed of a vehicle involved in an accident, type of vehicle, temperature or other ambient condition. The method may comprise attaching one or more of the attributes to the or each zone.

Data of point locations and, optionally, one or more attributes may be obtained from information held by one or more agencies, which may include government agencies, and/or may be collected from reports received from road users. The reports may be arranged to be received from road users' mobile devices and may be arranged to be received as automatic transmissions from vehicles which have been involved in an accident.

The method may comprise applying further processing to data related to the zones. In a preferred arrangement the method includes one or more of: discarding zones below a certain size, merging zones that are below a threshold proximity to each other, and/or enlarging zones to a minimum size.

The invention further encompasses computer software which, when executed by a computer, is arranged to perform the method according to the first aspect as described above, including any one or more of its associated optional and preferred steps. The computer software may be stored on a, e.g. non-transitory, computer-readable medium.

In accordance with another aspect of the invention there is provided a computing device, comprising:
a memory storing a digital map comprising a plurality of segments representing a network of navigable segments; and a processor operatively arranged to access the digital map and to:

apply point locations to the digital map which correspond to individual events on the network;

generate a heat map representing the concentrations of events according to a selected distribution function;

apply a threshold calculation to the heat map to identify one or more zones on the network having a high concentration of events; and associating the or each zone with at least one segment in the digital map.

The computing device may be a server, and which in embodiments may comprise communication means arranged to receive reports from a plurality of mobile devices having location determining means, the reports each comprising at least geographical data of an event. The processor of the server may be arranged to process any received reports and treat them as point locations for use in creating the map data. The computing device is therefore arranged to process data for the maintenance of a database containing the geographic location of route events. Accordingly, the communication means may be further arranged to transmit any new or changed map data to one or more of the plurality of mobile devices.

The map data created in embodiments of the present invention can be used by a mobile device to provide warnings as a user approaches a zone, e.g. in an audible, visual and/or haptic manner. In other embodiments, the mobile device may be arranged to display on a display screen a representation of at least a portion of the digital map showing one or more of the zones. In embodiments where the mobile device is a navigation device, e.g. a portable navigation device or a built-in vehicle navigation device, the map data can be used when calculating a route to the destination using the digital map. For example, a user may want to calculate a route to a destination that avoids, or at least minimises, segments having associated zones. The present invention therefore further encompasses a mobile device The present invention in any of these further aspects may include any or all of the preferred and optional features described herein as appropriate.

As will be appreciated by those skilled in the art, all of the described aspects and embodiments of the present invention can, and preferably do, include as appropriate, any one or more or all of the preferred and optional features described herein.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described by way of example only, with reference to the accompanying figures, in which:

FIGS. 6a and 6b show respectively a continuous heat field representing information about road traffic accidents, and a plurality of regions from the heat field;

FIG. 7 shows schematically an estimated heat map based upon only actual road geometry.

DETAILED DESCRIPTION OF PREFERRED EMBODIMENTS

The present invention is directed to a method and apparatus for creating map data for enhancing a digital map comprising a plurality of segments that are representative of segments of a navigable network, e.g. a road network. The created map data may, in preferred embodiments, be zones representative of accident black spots on the navigable network. The zones may be displayed superposed on a representation of the digital map. Additionally, or alternatively, and in embodiments where the digital map is used by a navigation device, the map data may be used when calculating a route using the digital map or to trigger warnings to a user as they approach, enter and/or leave a zone.

The map data created in embodiments of the present invention is thus preferably used by mobile devices having location determining means, e.g. a Global Navigation Satellite System (GNSS) receiver such as a GPS receiver, i.e. having the capability of identifying its own location. In the following description, the invention will be described with particular reference to portable navigation devices (PNDs). It should be remembered, however, that the teachings of the present invention are not limited to PNDs but are instead universally applicable to any type of processing device that is configured to warn or alert drivers when they are approaching a location identified as an accident black spot using a local and/or remote database featuring details of such locations. It follows therefore that in the context of the present invention, the mobile devices could be a PND, a navigation device built into a vehicle, or indeed a computing resource (such as a desktop or portable personal computer (PC), mobile telephone or portable digital assistant (PDA)).

Figure 1:
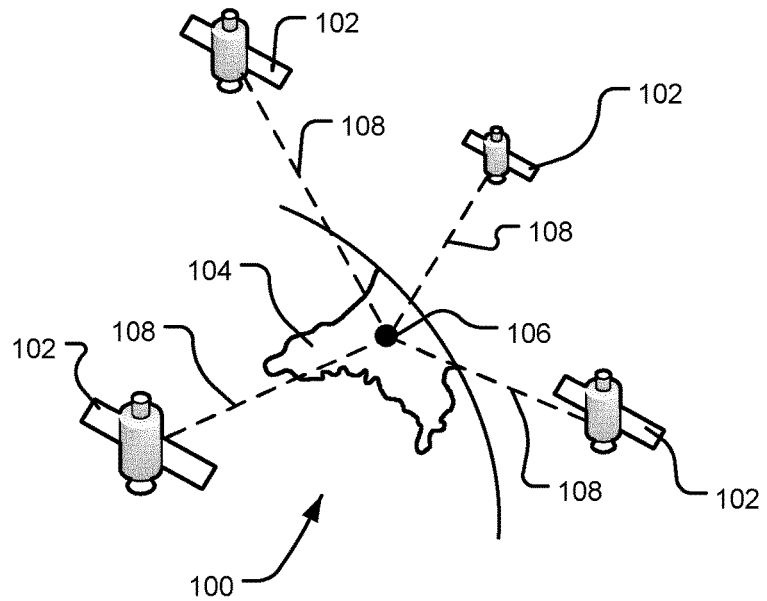
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites that orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 102 is in orbit about the earth 104. The orbit of each satellite 102 is not necessarily synchronous with the orbits of other satellites 102 and, in fact, is likely asynchronous. A GPS receiver 106 is shown receiving spread spectrum GPS satellite signals 108 from the various satellites 102.

The spread spectrum signals 108, continuously transmitted from each satellite 102, utilize a highly accurate frequency standard accomplished with an extremely accurate atomic clock. Each satellite 102, as part of its data signal transmission 108, transmits a data stream indicative of that particular satellite 102. It is appreciated by those skilled in the relevant art that the GPS receiver device 106 generally acquires spread spectrum GPS satellite signals 108 from at least three satellites 102 for the GPS receiver device 106 to calculate its two-dimensional position by triangulation. Acquisition of an additional signal, resulting in signals 108 from a total of four satellites 102, permits the GPS receiver device 106 to calculate its three-dimensional position in a known manner.

Figure 2:
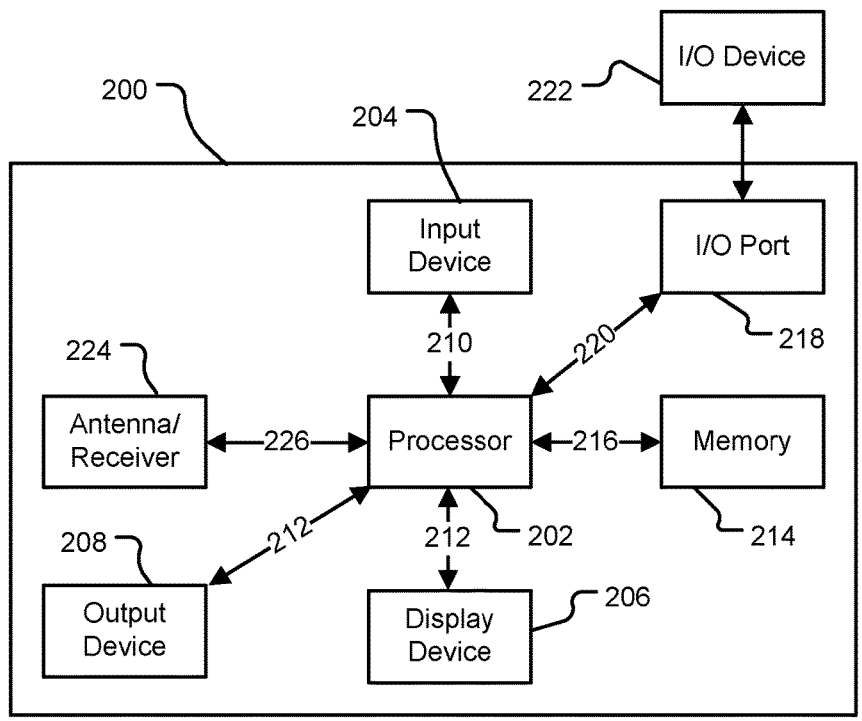
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 202 connected to an input device 204 and a display screen 206. The input device 204 can include a keyboard device, voice input device, touch panel and/or any other known input device utilised to input information; and the display screen 206 can include any type of display screen such as an LCD display, for example. In a particularly preferred arrangement the input device 204 and display screen 206 are integrated into an integrated input and display device, including a touchpad or touchscreen input so that a user need only touch a portion of the display screen 206 to select one of a plurality of display choices or to activate one of a plurality of virtual buttons.

The navigation device 200 may include an output device 208, for example an audible output device (e.g. a loudspeaker). As output device 208 can produce audible information for a user of the navigation device 200, it is should equally be understood that input device 204 can include a microphone and software for receiving input voice commands as well.

In the navigation device 200, processor 202 is operatively connected to and set to receive input information from input device 204 via a connection 210, and operatively connected to at least one of display screen 206 and output device 208, via output connections 212, to output information thereto. Further, the processor 202 is operably coupled to a memory resource 214 via connection 216 and is further adapted to receive/send information from/to input/output (I/O) ports 218 via connection 220, wherein the I/O port 218 is connectible to an I/O device 222 external to the navigation device 200. The memory resource 214 comprises, for example, a volatile memory, such as a Random Access Memory (RAM) and a non-volatile memory, for example a digital memory, such as a flash memory. The external I/O device 222 may include, but is not limited to an external listening device such as an earpiece for example. The connection to I/O device 222 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 202 and an antenna/receiver 224 via connection 226, wherein the antenna/receiver 224 can be a GPS antenna/receiver for example. It will be understood that the antenna and receiver designated by reference numeral 224 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

Figure 4:
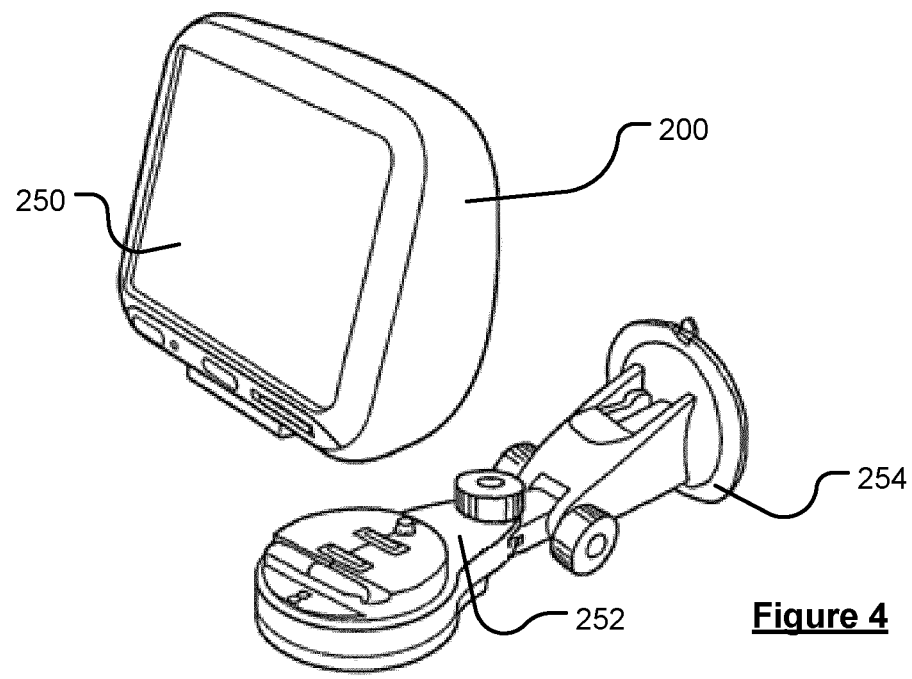
FIG. 4 is a perspective view of a navigation device.

In addition, the portable or handheld navigation device 200 of FIG. 2 can be connected or "docked" in a known manner to a vehicle such as a bicycle, a motorbike or a car for example. Such a navigation device 200 is then removable from the docked location for portable or handheld navigation use. As an example, FIG. 4 shows a navigation device 200 that may sit on an arm 252, which itself may be secured to a vehicle dashboard, window, etc. using a suction cup 254. This arm 252 is one example of a docking station to which the navigation device 200 can be docked. The navigation device 200 can be docked or otherwise connected to the arm 252 of the docking station by snap connecting the navigation device to the arm, for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 3:
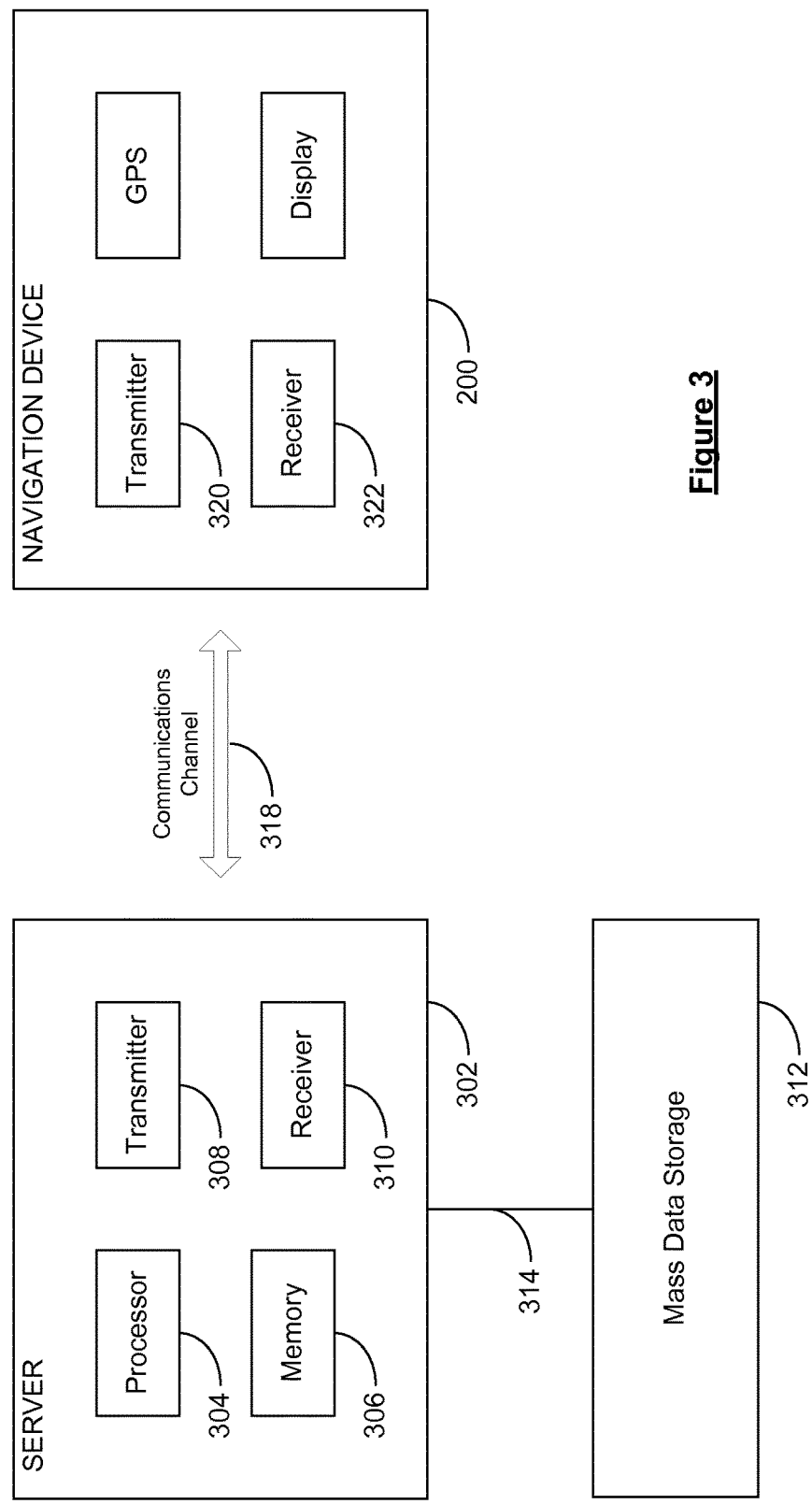
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever-changing spectrum of mobile phone models, manufacturers, etc; model/manufacturer specific settings may be stored on the navigation device 200, for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc. In other embodiments, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As is known in the art, the navigation device 200 may be configured to provide warnings when a vehicle is approaching a known accident black spot. The warnings may comprise a visual warning on the display 206 of the navigation device 200, an audible warning, a haptic warning, or any combination thereof as desired. In order to provide such warnings, the navigation device has access to a database of known accident black spots which will typically be stored on the navigation device 200, e.g. in the memory 214, and will be regularly updated with new data from the server 302 using the communication channel 318. It is envisaged, however, that the navigation device 200 may only temporary store portions of the database for accident black spots in their immediate vicinity or a planned route.

The accident black spots in the database may each have at least one attribute, and typically a plurality of attributes, associated therewith. The attributes can be, for example: the time of an accident, direction of travel and/or speed of a vehicle involved in an accident, type of vehicle, temperature or other ambient condition.

The information in the database on the server 302 needs to be constantly refreshed to ensure that it is accurate and up to date.

In accordance with an embodiment of the invention, point locations representative of the occurrence of events, in this case accidents on the road network, are obtained from third parties, e.g. from government data. The point locations may just be occurrences of fatal accidents, but they can include all accidents regardless of severity as desired. The point locations may also be received from user reports, e.g. input and transmitted by mobile devices, such as PNDs for example. Such reports may be transmitted automatically from devices in vehicles when an accident is determined to have occurred (e.g. based on vehicle motion sensors), or may be user generated. The point locations may have other attributes associated therewith, such as a time of the accident (hour of the day, day of the week, month, season, for example); a driving direction (since some roads may be "dangerous" when travelling in one direction, but not in the other); a driving speed; an ambient condition, such as an external temperature, and so on.

A digital map comprising a network of navigable segments representing the road network is accessed and the point locations are applied to the digital map. The individual locations are used to generate a heat map, preferably restricted to the network of navigable segments of a digital map, indicating the density of accidents along the network. The distribution function used to generate the heat map may only take into account the geodesic distance, but it may take into account other factors, such as road class, speed limit, average speed for traversing the segment, road surface and the like. Such factors may be known from attributes associated with the point locations, or derived from other sources based on the attributes associated with the point locations. For example, weather and/or temperature information may be obtained for the road at the time of the accident and/or for a period of time before the accident.

A suitable threshold is applied to the heat map to generate the accident black spot zones. The generated zones are then associated with the appropriate segments of the digital map. The point locations, and therefore the zones, may have one or more attributes associated therewith such as driving direction, weather/temperature, time, and so on, which can be used to determine whether or not warnings are to be provided to a driver.

There follows a description of one method of creating map data for the enhancement of a digital map of a route network, so that accident black spots may be identified on the map which may be displayed in a mobile navigation device such as a PND, for example, in accordance with an embodiment of the present invention.

The method uses a technique of heat-map based region fusion, the aim of which is to detect continuous fields that are invisible or impossible to measure directly but can be estimated be integration of multiple single observations.

Whereas it is usually possible to determine quite precisely where a car accident happened, it is not straightforward to determine directly where roads are dangerous. However, one can expect that accidents happen more often on dangerous roads than anywhere else. On this basis it should be possible to estimate the danger of driving a road by taking the frequency of accidents into account. Accidents on a dangerous road do not necessarily happen at precisely the same spot. For example, a slippery curve may be dangerous along a broad stretch or the road.

Figure 5:
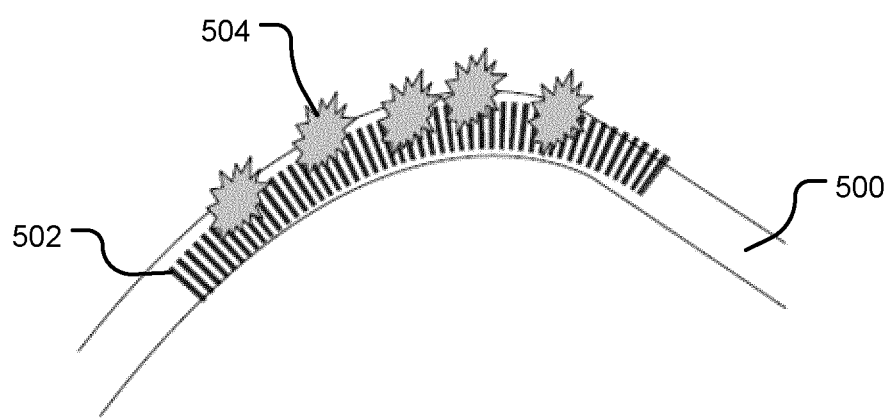
FIG. 5 is a schematic representation of a part of a road, showing instances of road traffic accidents.

FIG. 5 shows an example of a slippery curve 500 of a road. The hatched area 502 is where the centripetal force pulls cars in a perpendicular direction off the road. Whilst the centripetal force cannot itself be seen, over a period it is possible to observe several car accidents happening in the dangerous curve. In the drawing the locations of some of the car accidents are indicated by the features 504.

Integrating local occurrences of accidents over a period reveals the likelihood of a road being dangerous. In the following, a general method will be explained that allows the detection of road stretches having a generic property that manifests itself in point events.

Regarding FIG. 5, the road is dangerous in the hatched area 502. However, this danger is not visible. It can only be estimated by integrating multiple single accidents 504 that happened over a period. In order to determine zones that have increased likelihood of a certain attribute, two main steps are necessary. Firstly, a continuous heat field f̂(x) must be calculated from a discrete point cloud of observations. Every observation distributes its heat in space according to a distribution function K. The distribution function takes only one parameter, which is the distance between the observation $x_i$ and any point x in space. The distance metric d determines how the distance between two points is measured. The continuous heat field f̂(x) is defined as follows:

$$\hat{f}(x) = \sum_{i=1}^{N} K(d(x, x_i))$$

It should be noted that x can be an element of any n-dimensional space. Implementations might consider, but are not limited to, events that appear in high-dimensional spaces such as geo-coordinates plus time and/or temperature, for example, making the field f̂(x) time and/or temperature dependent. This can be of useful for triggering warnings on roads, but only when the outside temperature is below a certain value. The distribution function describes how a single event distributes its weight in space. The distribution function should be normalized, meaning its integral over the whole space should not be infinite, but rather reflect the actual weight of the event.

A prominent distribution function is the normal (Gaussian) distribution, but other distributions, such as uniform or triangular, for example, might be applicable as well, depending on the particular use case.

The reference implementation for accident black spots operates in a 2d-space, even further restricted to the road geometry. It uses normal (Gaussian) distribution as the distribution function and geodesic distance, i.e. "as the crow flies". Other meaningful metrics might include, but are not limited to: driving distance, road speed, road class, road surface, road shape, road angle. External factors can also be considered for real time calculations, e.g. g-forces, weather condition (fog, heavy rain, gales), temperature (icing), etc. The choice of the metric and distribution function depends on the application.

Since the density f̂(x) will not be evaluated in the whole 2d space, the density estimation is computed on road geometry only, in the example application.

Calculating the heat map works similarly to the well-known Kernel density estimation with the difference that the heat map does not need to be normalized.

Once the heat map f̂(x) is calculated, the second step is to detect regions in which the heat exceeds a certain threshold, denoted herein as $\hat{f}_t$. The region(s) are all connected (sub-) spaces in which $\hat{f}(x) > \hat{f}_t$, each connected space becoming one region.

FIGS. 6a and 6b show one example how a continuous heat field is cut into regions. FIG. 6a shows an example of the continuous heat field f̂(x). FIG. 6b shows the regions 602—i.e. each connected (sub-) space of FIG. 6a, where $\hat{f}(x) > \hat{f}_t$ forms one region.

In the example implementation where the space is the road network only, this may be achieved by traversing from junction to junction or dead-end, drawing zones/road stretches where the local heat is larger than the threshold.

FIG. 7 shows an example of a heat map calculated from three points 702 representing known accidents; each being shown by a danger icon. Some portions of the road network are shown in thick solid lines 710, others in thin solid lines 711 and yet others in dotted lines 712. The dotted lines 712 depict areas on the road network having a low value of the heat field; the thin solid lines 711 depict areas having an intermediate value of the heat field; and the think solid lines 710 depict areas having a high value of the heat field. Given that the point observations are accidents, the high density areas 710 have a higher likelihood of being dangerous than either the intermediate density areas 711 or the low density areas 712. Setting the threshold to high density areas only would result in four zones covering the whole junction, when approached from all different driving directions, implementation can consider obeying the driving direction on involved stretches of the road (or omit it if desired). Alternatively an area can be defined as a square or elliptical shape that alerts any drivers entering the area. If the threshold were to be set at intermediate density levels, there would be more resulting zones, for example also in the opposite lane. The choice of the heat threshold is one of the main tuning parameters that toggles the sensitivity of the region detection and hence the length and number of created zones.

Figure 8:
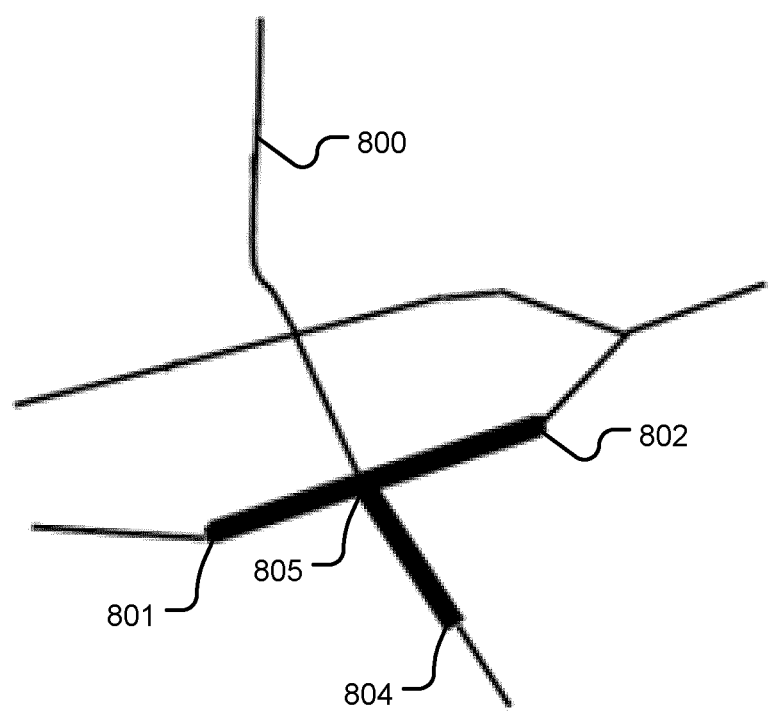
FIG. 8 illustrates a portion of road network on a display, in which portions of road are shown for which the incidence of traffic accidents is greater than a predetermined threshold.

FIG. 8 shows the result of the region scanning at another location. The parts of the road network 800 where the heat exceeds the threshold are covered with zones, illustrated as thick lines. A first zone extends from point 801 to point 802, and a second zone extends from point 804 to point 805.

The zones generated from applying the threshold $\hat{f}(x) > \hat{f}_t$ on the heat map might not be immediately useable, e.g. as they may result in a bad user experience. For example, if a black spot zone of only 1 m length or less were to be considered, whilst this 1 m might indeed be considered dangerous, it is also true that an approaching vehicle would pass such a zone in virtually no time, so the cumulative likelihood of being involved into an accident while traversing this zone is low. It might also happen that due to limitations of the presentation layer of the device (e.g. a PND, mobile app, etc.), the result of the fusion might need to be optimized for the display. Therefore some post-processing of the results of the initial method might be needed, in order to align the results with additional constraints. Typical post-processing actions can be, but are not limited to, discarding (ignoring) regions below a certain length, e.g. 5 m, merging regions to close gaps, if the separation is less than e.g. 10 m, and enlarging small regions to a desired minimum length, so that if zones are greater than e.g. 5 m, but less than e.g. 20 m, such zones are extended to a minimum length of e.g. 20 m.

The general algorithm takes only one parameter, which is the heat threshold. This separates areas in which a region should be created from the rest. The implementation might, of course, take additional parameters. The reference implementation used for accident black spot fusion uses the normal distribution as distribution function and hence takes the standard deviation as an additional parameter that determines the width of the normal distribution.

It will be appreciated that whilst various aspects and embodiments of the present invention have heretofore been described, the scope of the present invention is not limited to the particular arrangements set out herein and instead extends to encompass all arrangements, and modifications and alterations thereto.

Whilst embodiments described in the foregoing detailed description refer to GPS, it should be noted that the mobile devices 200, e.g. navigation apparatus, may utilise any kind of position sensing technology as an alternative to, or indeed in addition to, GPS. For example, the navigation apparatus may utilise other global navigation satellite systems, such as the European Galileo system. Equally, it is not limited to satellite-based systems, but could readily function using ground-based beacons or other kind of system that enables the device to determine its geographic location.

The example described above is concerned with the incidence of road traffic accidents. However, data concerning other types of event on the route network may be used alternatively, or in addition, to enhance the map.

Further, embodiments of the present invention are described with reference to route segments which are exemplified as road segments. However it should be realised that the invention may also be applicable to other navigation segments, such as segments of a path, river, canal, cycle path, tow path, railway line, or the like. For ease of reference these are commonly referred to as a road segment.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A computer-implemented method of creating map data for enhancing a digital map comprising a plurality of navigable segments representing a network of navigable segments, the computer-implemented method comprising:
    applying, by a processor, point locations to the digital map which correspond to individual events on the network;
    generating, by the processor, a heat map representing concentrations of events according to a selected distribution function, the generating comprising using the selected distribution function to compute a multi-dimensional distribution of a heat associated with each event and summing the multi-dimensional distribution of heat associated with each event to form the heat map;
    applying, by the processor, a threshold calculation to the heat map to identify one or more zones on the network having a high concentration of events;
    associating, by the processor, a or each zone of the identified one or more zones with at least one segment in the digital map, the associating comprising associating the or each zone with all road segments that are located within a region defined by the or each zone;
    determining, based on the or each zone associated with segments in the digital map, that a travel path of a mobile device is to use a segment associated with one or more of the or each zone and providing a warning, via the mobile device, regarding the one or more of the or each zone.

2. The method according to claim 1, wherein associating the or each zone with at least one segment comprises associating zone location information with the segment, so as to indicate the location of the zone within the segment.

3. The method according to claim 1, wherein the point locations correspond to events comprising traffic accidents of one or more types selected from a plurality of types of accidents.

4. The method according to claim 1, wherein the point locations have one or more attributes including, but not limited to: a time of an accident, direction of travel, speed of a vehicle involved in an accident, type of vehicle, temperature or other ambient condition.

5. The method according to claim 4, wherein the method includes associating at least one of the one or more attributes to the or each zone.

6. The method according to claim 1, wherein data of point locations is collectable from reports received from road users.

7. The method according to claim 6, wherein the reports are arranged to be received as automatic transmissions from mobile devices in vehicles that have been involved in an accident.

8. The method according to claim 1, wherein the method further comprises applying further processing to data related to the zones.

9. The method according to claim 8, wherein the method includes one or more of: discarding zones below a certain size, merging zones that are below a threshold proximity of each other, and enlarging zones to a minimum size.

10. A computing device, comprising:
    a memory storing a digital map comprising a plurality of segments representing a network of navigable segments; and
    a processor operatively arranged to access the digital map and to:
        apply point locations to the digital map which correspond to individual events on the network;
        generate a heat map representing concentrations of events according to a selected distribution function, the generating comprising using the selected distribution function to compute a multi-dimensional distribution of a heat associated with each event and summing the multi-dimensional distribution of heat associated with each event to form the heat map;
        apply a threshold calculation to the heat map to identify one or more zones on the network having a high concentration of events;
        associate a or each zone of the identified one or more zones with at least one segment in the digital map, the associating comprising associating the or each zone with all road segments that are located within a region defined by the or each zone; and
        determine, based on the or each zone associated with segments in the digital map, that a travel path of a mobile device is to use a segment associated with one or more of the or each zone and provide a warning, via the mobile device, regarding the one or more of the or each zone.

11. The computing device of claim 10, wherein the computing device comprises a server system arranged to process data for maintenance of a database containing a geographic location of events, the server system comprising communication means for receiving reports from a plurality of mobile devices having location determining means, the reports each comprising at least geographical location data of an event.

12. A non-transitory computer-readable medium which stores a set of instructions which when executed performs a method of creating map data for enhancing a digital map comprising a plurality of navigable segments representing a network of navigable segments, the method executed by the set of instructions comprising:
    applying point locations to the digital map which correspond to individual events on the network;

generating a heat map representing concentrations of events according to a selected distribution function, the generating comprising using the selected distribution function to compute a multi-dimensional distribution of a heat associated with each event and summing the multi-dimensional distribution of heat associated with each event to form the heat map;

applying a threshold calculation to the heat map to identify one or more zones on the network having a high concentration of events;

associating a or each zone of the identified one or more zones with at least one segment in the digital map, the associating comprising associating the or each zone with all road segments that are located within a region defined by the or each zone; and determining, based on the or each zone associated with segments in the digital map, that a travel path of a mobile device is to use a segment associated with one or more of the or each zone and providing a warning, via the mobile device, regarding the one or more of the or each zone.

13. The computing device according to claim 10, wherein associating the or each zone with at least one segment comprises associating zone location information with the segment to indicate the location of the zone within the segment.

14. The computing device according to claim 10, wherein the point locations correspond to events comprising traffic accidents of one or more types selected from a plurality of types of accidents.

15. The computing device according to 10, wherein the point locations have one or more attributes including, but not limited to: a time of an accident, direction of travel, speed of a vehicle involved in an accident, type of vehicle, temperature or other ambient condition.

16. The computing device according to claim 10, wherein data of point locations is collectable from reports received from road users.

17. The computing device according to claim 16, wherein the reports are arranged to be received as automatic transmissions from mobile devices in vehicles that have been involved in an accident.

18. The computing device according to claim 10 further comprising applying further processing to data related to the identified one or more zones to discard or ignore zones below a certain length, merge zones having gaps below a predetermined length, or enlarge zones to a predetermined minimum length.

19. The computing device according to claim 18, wherein further processing includes one or more of: discarding zones below a certain size, merging zones that are below a threshold proximity of each other, and enlarging zones to a minimum size.

20. The computing device of claim 10, wherein the distribution function is based on at least one of: a geodesic distance, road class, speed limit, an average speed for traversing a navigable segment, and a road surface.

* * * * *